(12) United States Patent
Takeuchi et al.

(10) Patent No.: US 7,400,825 B2
(45) Date of Patent: Jul. 15, 2008

(54) IMAGING DEVICE AND METHOD OF CONTROLLING THE SAME

(75) Inventors: Yoshio Takeuchi, Osaka (JP); Yosuke Yamane, Neyagawa (JP); Manabu Kitamura, Osaka (JP); Hiroyuki Kawahara, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 230 days.

(21) Appl. No.: 10/532,005

(22) PCT Filed: Oct. 19, 2004

(86) PCT No.: PCT/JP2004/015422

§ 371 (c)(1),
(2), (4) Date: Dec. 28, 2005

(87) PCT Pub. No.: WO2005/045516

PCT Pub. Date: May 19, 2005

(65) Prior Publication Data

US 2006/0127071 A1    Jun. 15, 2006

(30) Foreign Application Priority Data

Oct. 20, 2003    (JP) .............................. 2003-358671

(51) Int. Cl.
*G03B 3/00* (2006.01)

(52) U.S. Cl. ....................... 396/90; 396/55; 348/208.99

(58) Field of Classification Search .................. 396/90; 348/208.99, 208.4, 208.11, 208.12
See application file for complete search history.

(56) References Cited

U.S. PATENT DOCUMENTS

| 4,970,540 | A | * | 11/1990 | Vasey et al. ................... 396/55 |
| 5,095,198 | A |   | 3/1992  | Nakazawa et al. |
| 5,157,433 | A | * | 10/1992 | Onozuka et al. .............. 396/90 |

(Continued)

FOREIGN PATENT DOCUMENTS

JP          1-131521        5/1989

(Continued)

*Primary Examiner*—W. B. Perkey
*Assistant Examiner*—Michael A Strieb
(74) *Attorney, Agent, or Firm*—Wenderoth, Lind & Ponack, L.L.P.

(57) ABSTRACT

An imaging apparatus measures shake of the apparatus using a gyro sensor, performs "a center stop control" until receiving an instruction to start recording the still picture, and performs "a lens correction control" after the start of exposure in the imaging apparatus. The center stop control controls the correction lens position to stop a correction lens at an optical axis center position (position of the correction lens at which an optical axis of the imaging lenses coincides with an optical axis of a correction lens). The lens correction control controls the correction lens position to correct blurring of the image formed on an imaging element based on the measuring result. The imaging apparatus returns the correction lens to the optical axis center position before receiving a next instruction to start a next recording, and then performs the center stop control on the correction lens.

7 Claims, 11 Drawing Sheets

U.S. PATENT DOCUMENTS

| | | | |
|---|---|---|---|
| 5,337,098 A | | 8/1994 | Imafuji et al. |
| 5,463,443 A | | 10/1995 | Tanaka et al. |
| 5,546,159 A | | 8/1996 | Imura et al. |
| 5,740,473 A | | 4/1998 | Tanaka et al. |
| 5,794,081 A | | 8/1998 | Itoh et al. |
| 5,835,798 A | * | 11/1998 | Kitagawa ............... 396/55 |
| 5,881,324 A | | 3/1999 | Imada |
| 5,978,599 A | * | 11/1999 | Wakabayashi et al. ....... 396/52 |
| 5,978,600 A | * | 11/1999 | Takeuchi et al. ............ 396/53 |
| 6,006,041 A | | 12/1999 | Mizumaki et al. |
| 6,225,613 B1 | * | 5/2001 | Tsukamoto et al. ...... 250/201.2 |
| 6,332,060 B1 | * | 12/2001 | Miyamoto et al. ........... 396/55 |
| 6,356,713 B1 | | 3/2002 | Sato |
| 6,393,215 B1 | | 5/2002 | Washisu |

FOREIGN PATENT DOCUMENTS

| | | | |
|---|---|---|---|
| JP | 2-137813 | | 5/1990 |
| JP | 4-335331 | | 11/1992 |
| JP | 5-224270 | | 9/1993 |
| JP | 5-249529 | | 9/1993 |
| JP | 06-148731 | * | 5/1994 |
| JP | 7-234430 | | 9/1995 |
| JP | 7-244324 | | 9/1995 |
| JP | 8-6095 | | 1/1996 |
| JP | 8-313953 | | 11/1996 |
| JP | 9-61873 | | 3/1997 |
| JP | 9-80500 | | 3/1997 |
| JP | 09-080500 | * | 3/1997 |
| JP | 9-138434 | | 5/1997 |
| JP | 10-90587 | | 4/1998 |
| JP | 10-339909 | | 12/1998 |
| JP | 11-231368 | | 8/1999 |
| JP | 2000-75339 | | 3/2000 |
| JP | 2000-187258 | | 7/2000 |
| JP | 2001-21936 | | 1/2001 |

* cited by examiner

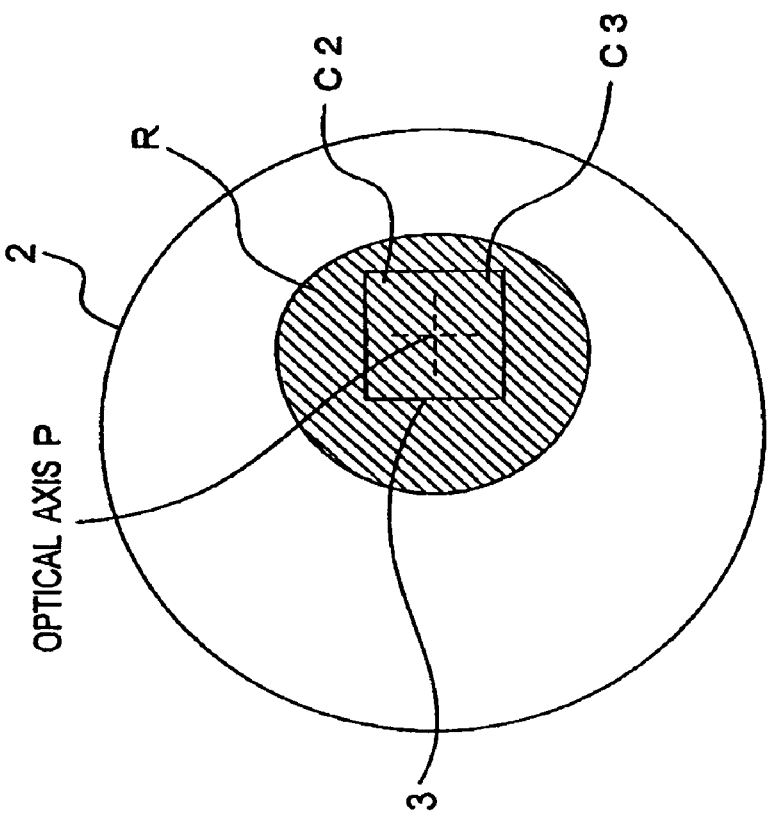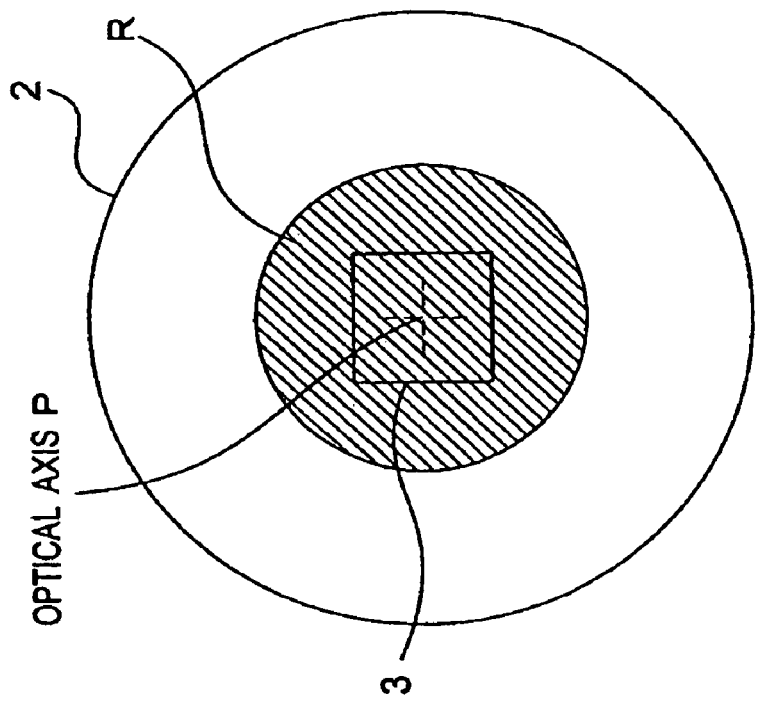

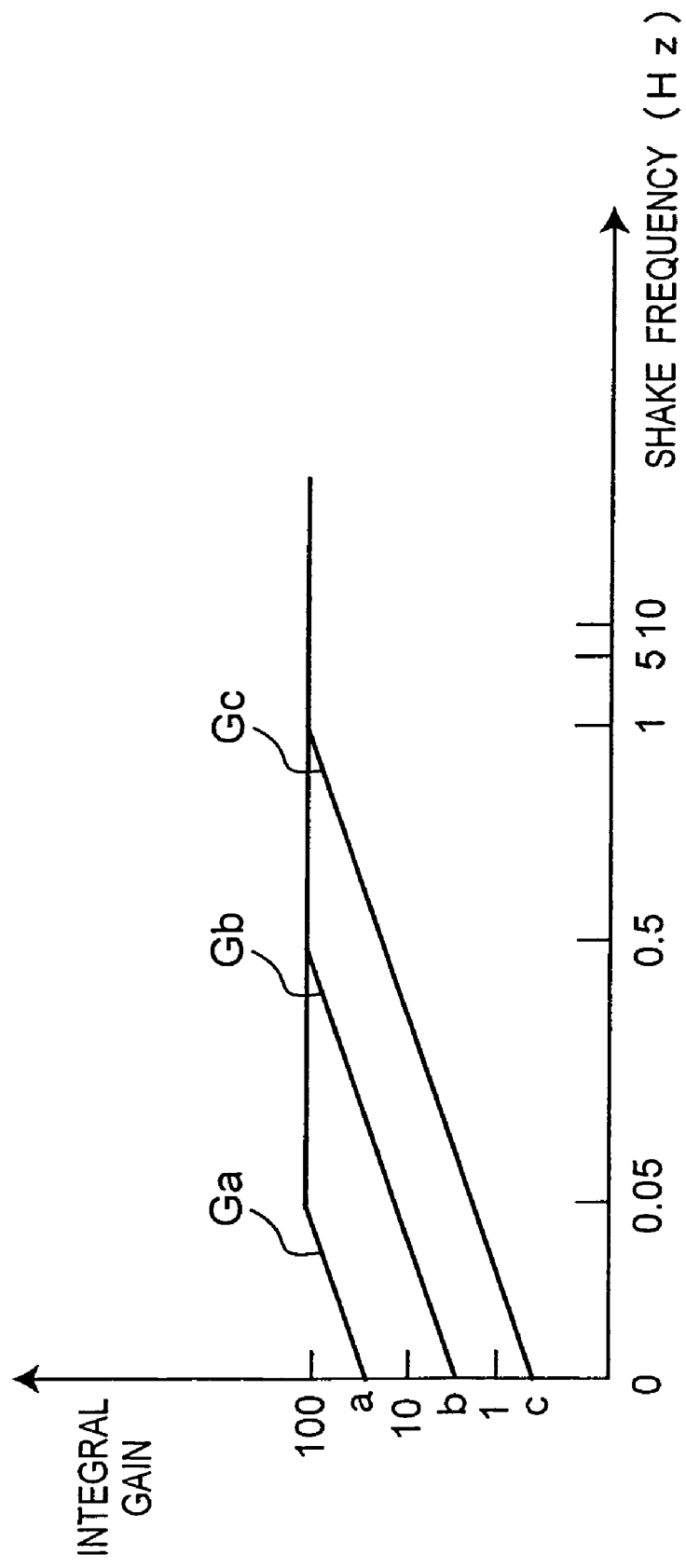

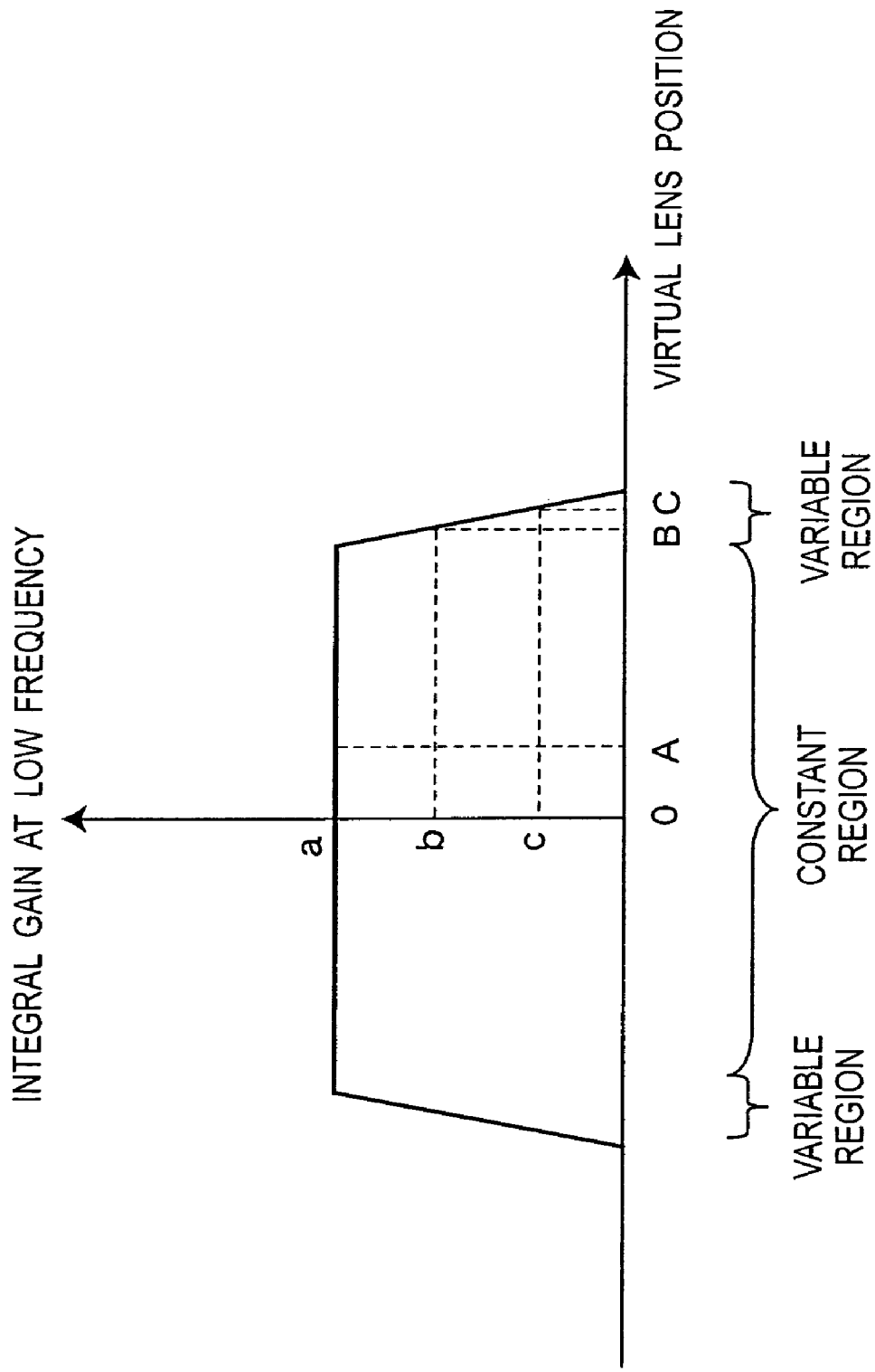

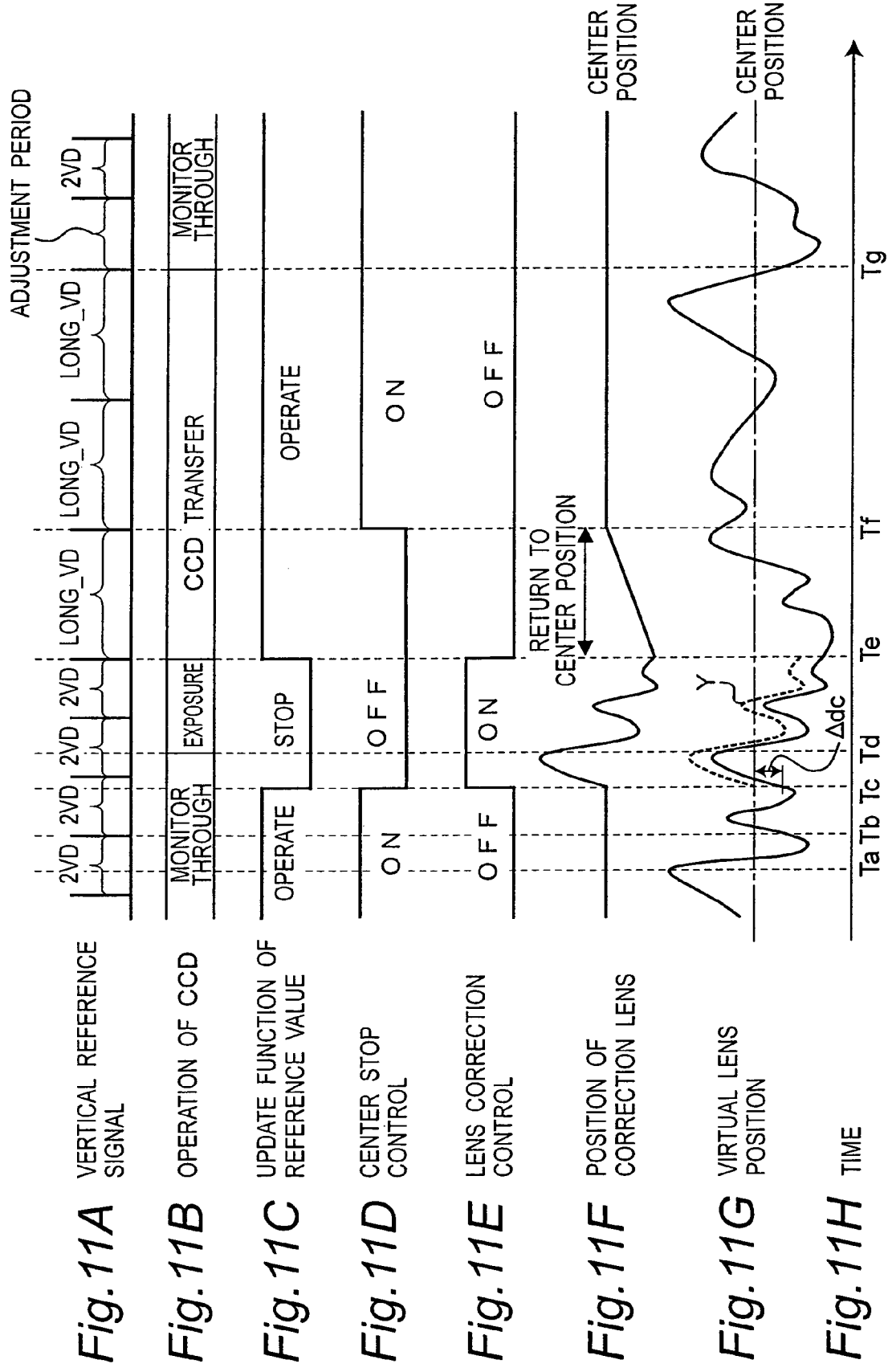

IMAGING DEVICE AND METHOD OF CONTROLLING THE SAME

BACKGROUND OF THE INVENTION

1. Field of the Invention

The present invention relates to an imaging apparatus with a hand-shake (i.e., shaking of a hand holding the imaging apparatus) correction function, and more particularly to an imaging apparatus suitable for imaging a still picture.

2. Description of the Related Art

Recently, as a zoom factor of a digital camera increases, hand-shake (i.e., shaking of the hand) correction is becoming more and more important. Conventional technologies of hand-shake correction are disclosed, for example, in patent documents 1 to 3 (*1, *2, *3).

The camera disclosed in patent document 1 detects an eccentric amount of hand-shake along the optical axis, and indicates a direction to which the camera is to be moved so as to nullify the eccentric amount.

According to the camera of patent document 1, the user moves the camera according to the indication, and is allowed to have a wide stroke of hand-shake correction lens against hand-shake in any direction, so that a picture free from hand-shake can be obtained. That is, by manipulation by the user, the range of hand-shake correction can be utilized effectively. In this technique, however, the user must move the camera, and the user is requested to make complicated and difficult operations. Indeed it is considered that the user hardly has the freedom to take a desired picture freely.

By contrast, patent documents 2 and 3 disclose the technology of correcting image blurring automatically.

The image blurring correction technology of patent document 2 is directed to prevent a correction optical system from hitting against the limit of a movable zone (a region in which the correction optical system is moved for correcting the hand-shake). More specifically, when the correction optical system is near the limit of the movable zone, the correction optical system is centered before the correction operation of image blurring is started.

The patent document 3 discloses the technology of starting blurring correction by setting the correction optical system at the center position after pressing the release button (shutter button). More specifically, after pressing the release button, the mirror is moved up, the correction optical system is set at the center position, and the blurring correction operation is started. Then, the shutter is released to expose a film with adequate quantity of light, and the shutter is closed.

(*1) Patent document 1: JP 05-249529 A
(*2) Patent document 2: JP 01-131521 A
(*3) Patent document 3: JP 05-224270 A

SUMMARY OF THE INVENTION

Problems to be Solved by the Invention

In a digital camera, the importance of hand-shake correction technology is increasing as mentioned above, and it is also one of the important problems to shorten the imaging time at starting exposure right after the user's instruction to start imaging by pressing of the shutter button. When the hand-shake correction is executed, even if a start of imaging is instructed, exposure cannot be started until the hand-shake correction operation is completed. Thus the hand-shake correction may cause to prevent shortening of the imaging time of a still picture.

The patent document 2 teaches nothing about execution timing of centering operation of the correction optical system. If centering operation of the correction optical system is started, for example, after pressing the shutter button, it may take much time until an image blurring correction operation is started, and in total it takes longer in the imaging of a still picture.

In the technology of patent document 3, the correction optical system is set at the center position after pressing the release button (i.e., after instruction of imaging is issued). In other words, exposure cannot be started until the setting of the correction optical system at the center position is completed. Consequently, the technology of patent document 3 takes a significant amount of time from the instruction to start imaging until the start of the exposure operation, resulting in long time for imaging.

The invention is directed to solve the above problems, and it is hence an object thereof to present an imaging apparatus capable of reducing the imaging time of still pictures while preventing hand-shake.

Means for Solving the Problems

An imaging apparatus according to the invention is an imaging apparatus for generating still picture data by receiving an optical signal of a subject.

The imaging apparatus includes: an imaging element that generates a still picture by exposing with an optical signal of the subject; a plurality of imaging lenses that collect the optical signal of the subject and focuses an image on the imaging apparatus; a correction lens that is movable on a plane vertical to an optical axis of the imaging lenses so as to correct image blurring formed on the imaging element; a measuring section that measures shake of the imaging apparatus; an instruction section that instructs a start of recording a still picture generated by the imaging element; and a lens controller that selectively performs "a center stop control" and "a lens correction control". The center stop control is operable to control the correction lens position so as to stop the correction lens at an optical axis center position which is a position of the correction lens at which an optical axis of the imaging lenses coincides with an optical axis of the correction lens. The lens correction control is operable to control the correction lens position so as to correct blurring of the image formed on the imaging element based on the measuring result of the measuring section.

The lens controller performs the center stop control until receiving an instruction to start recording from the instruction section, and performs the lens correction control after the start of exposure in the imaging apparatus. The lens controller returns the correction lens to the optical axis center position before receiving a next instruction to start the next recording from the instruction section after completion of the exposure to the imaging element, and then performs the center stop control on the correction lens.

The imaging apparatus may further include an image processor that processes the image by receiving the still picture transferred from the imaging element. In this case, the lens controller may preferably control the correction lens to return the correction lens to the optical axis center position, before completion of transfer of a still picture from the imaging element to the image processor after completion of exposure in the imaging element.

The lens controller may start the lens correction control earlier than the start time of exposure of the imaging element by a time necessary for controlling the correction lens in a stable manner.

The lens controller may include a reference value updating function for updating a reference value used for judging the measuring result of the measuring section, and keeping the reference value updating function inactivate while controlling the lens correction.

The imaging apparatus may further include an integrating section that integrates the result of the measuring section.

The lens controller may calculate a virtual position of the correction lens on the basis of the output of the integrating section, and may perform the lens correction control according to the virtual position. The integrating section may adjust a gain on the integration of the result of the measuring section according to the virtual position of the correction lens calculated by the lens controller.

When a region of shake frequency of the imaging apparatus is smaller than a predetermined value, the integrating section may adjust the gain so that the gain is constant when the virtual position of the correction lens is within a predetermined range from the optical axis center position, and so that the gain decreases along with the distance from the optical axis center position when the virtual position of the correction lens is outside of the predetermined range.

Further, the integrating section may adjust the gain so that the gain increases along with an increase of the shake frequency when the shake frequency of the imaging apparatus is smaller than the predetermined value, and so that the gain is constant when the shake frequency of the imaging apparatus is more than the predetermined value.

A control method according to the invention is a method to control an imaging apparatus for generating still picture data by receiving an optical signal of a subject. The imaging apparatus has an imaging element that generates a still picture by exposing, with an optical signal of the subject, a plurality of imaging lenses that collect the optical signal of the subject and focus an image on the imaging element, and a correction lens movable on a plane vertical to an optical axis of the imaging lenses to correct image blurring formed on the imaging element.

The control method includes: measuring shake of the imaging apparatus; receiving an instruction to start recording a still picture generated in the imaging element; performing a center stop control until receiving an instruction to start recording the still picture (the center stop control controls the correction lens position so as to stop the correction lens at an optical axis center position which is a position of the correction lens at which an optical axis of the imaging lenses coincides with an optical axis of the correction lens); performing a lens correction control after the start of the exposure in the imaging apparatus (the lens correction control is for controlling the correction lens position so as to correct blurring of the image formed on the imaging element based on the measuring result); returning the correction lens to the optical axis center position before receiving a next instruction for the start of a next recording after completion of the exposure to the imaging element, and then performing the center stop control on the correction lens.

An imaging apparatus in another aspect of the invention is an imaging apparatus for generating still picture data by receiving an optical signal of a subject.

The imaging apparatus includes: an imaging element that generates a still picture by exposing with an optical signal of the subject; a plurality of imaging lenses that collect the optical signal of the subject and focuses an image on the imaging apparatus; a correction lens that is movable on a plane vertical to an optical axis of the imaging lenses so as to correct image blurring formed on the imaging element; a measuring section that measures a shake of the imaging apparatus; an instruction section that instructs a start of recording a still picture generated by the imaging element; and a lens controller that selectively performs "a central neighborhood correction control" and "a lens correction control". The central neighborhood correction control is operable to control the correction lens position so as to stop the correction lens in the vicinity of an optical axis center position which is a position of the correction lens at which an optical axis of the imaging lenses coincides with an optical axis of the correction lens. The lens correction control controls the correction lens position so as to correct blurring of the image formed on the imaging element on the basis of the measuring result of the measuring section.

The lens controller performs the central neighborhood correction control until receiving an instruction to start recording from the instruction section, and performs the lens correction control after the start of exposure in the imaging apparatus. The lens controller returns the correction lens to the optical axis center position before receiving a next instruction to start the next recording from the instruction section after completion of the exposure to the imaging element, and then performs the central neighborhood correction control on the correction lens.

Effects of the Invention

The invention presents an imaging apparatus capable of reducing the time required by an imaging operation while enabling a user to take a picture favorably by decreasing influence of hand-shake.

BRIEF DESCRIPTION OF DRAWINGS

FIG. 2A is a diagram showing a relationship of a correction lens, a CCD, and an image focusing region when the center of the correction lens is on an optical axis of imaging lenses, FIG. 2B is a diagram showing the relationship of the correction lens, the CCD, and the image focusing region when the center of the correction lens is off the optical axis of the imaging lenses.

FIG. 8 is a diagram showing a frequency characteristic of an integral gain adjusted by a gain control section.

FIG. 9 is a diagram showing a characteristic of an integral gain in a low frequency region with respect to a virtual gain position.

FIG. 11A is a timing chart of a vertical reference signal of the imaging apparatus according to Third Embodiment.

FIG. 11B is a timing chart showing a transition of an operation of the CCD of the imaging apparatus according to Third Embodiment.

FIG. 11C is a timing chart showing an operation/stop state of an updating function of a reference value of the imaging apparatus according to Third Embodiment.

FIG. 11D is a timing chart showing an on/off state of a center stop control of the imaging apparatus according to Third Embodiment.

FIG. 11E is a timing chart showing an on/off state of a lens correction control of the imaging apparatus according to Third Embodiment.

FIG. 11F is a timing chart showing a change in a correction lens position of the imaging apparatus according to Third Embodiment.

FIG. 11G is a timing chart showing a change in a virtual lens position of the imaging apparatus according to Third Embodiment.

FIG. 11H is a time elapsed for FIGS. 11A to 11G.

DETAILED DESCRIPTION OF THE INVENTION

Referring now to the accompanying drawings, exemplary embodiments of imaging apparatus of the invention are specifically described below.

First Embodiment

Figure 1:
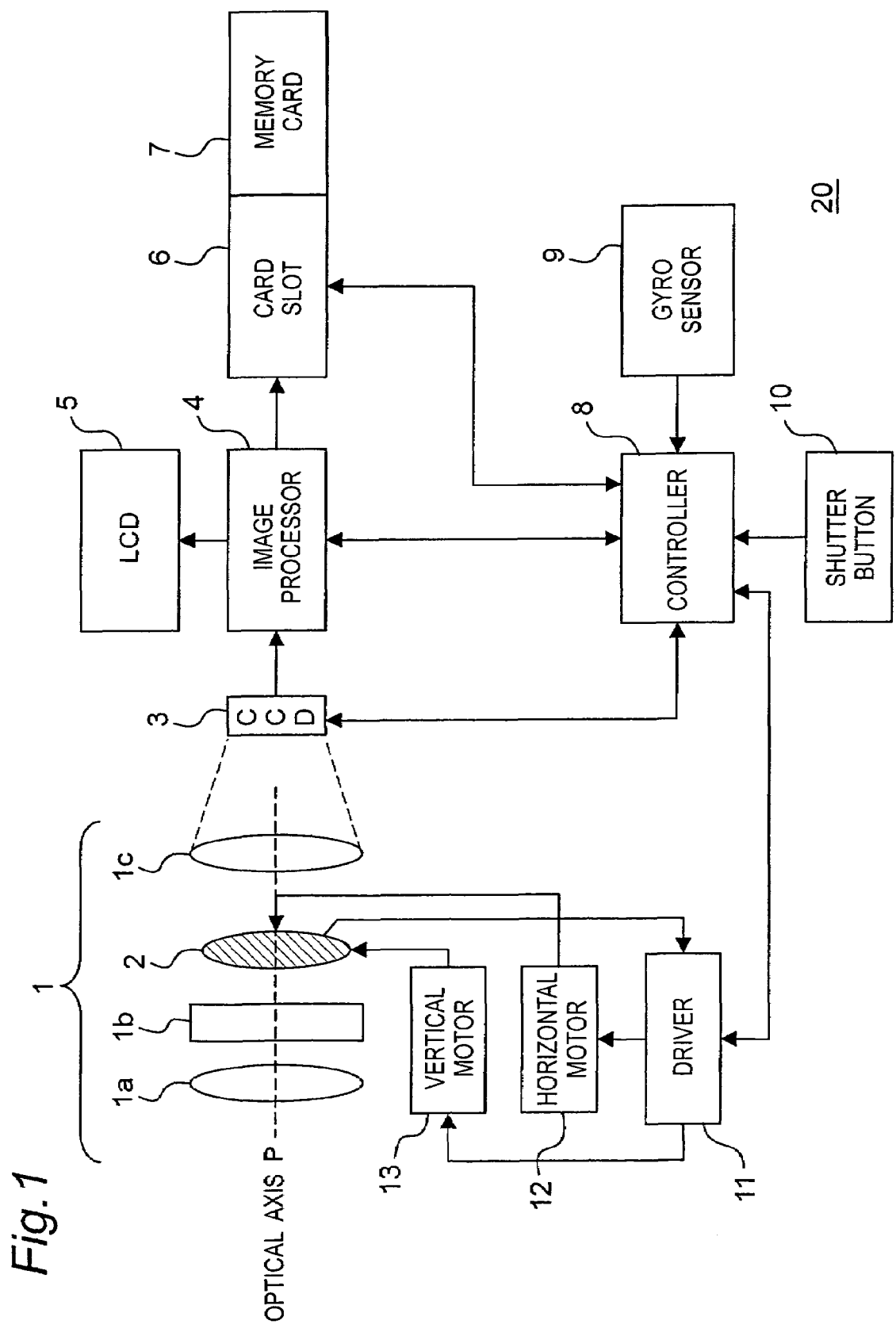
FIG. 1 is a block diagram of a digital camera of the invention.

FIG. 1 is a block diagram of a digital camera according to the invention. A digital camera 20 includes a set 1 of imaging lenses including lenses 1a to 1c and a correction lens 2, as an optical system. The digital camera 20 further includes a CCD 3 for converting an optical signal collected by the optical system into an electrical signal, an image processor 4 for image-processing the output signal from the CCD 3, motors 12, 13 and a driver 11 for moving the correction lens 2, a controller 8 for controlling operation of sections in the digital camera 20, and a gyro sensor 9 for detecting shake of the digital camera 20. The digital camera 20 further is provided with a liquid crystal display (LCD) monitor 5 for displaying a shot image, a card slot 6 for loading a memory card 7 as an image recording medium, and a shutter button 10.

The digital camera 20 drives the correction lens 2 by the horizontal motor 12 and vertical motor 13 based on measuring result of the gyro sensor 9, thus correcting blurring of an image focused on the CCD 3. More specifically, the digital camera 20 executes, optionally, a center stop control and a lens correction control. The center stop control is to control the correction lens 2 so that the center (optical axis) of the correction lens 20 stops at a position ("the optical axis center position") which coincides with the optical axis of the set of imaging lenses 1. The lens correction control is to control the position of the correction lens 2 so as to correct blurring of an image formed on the CCD 3 based on the measuring result of the gyro sensor 9. At this time, the digital camera 20 executes the center stop control at least until the shutter button 10 is pressed fully, and executes the lens correction control after the shutter button 10 is pressed fully.

Each lens 1a to 1c in the set of imaging lenses 1 is held in a lens barrel (not shown). The imaging lenses 1 collects an optical signal from a subject to focus an image on the CCD 3. The lenses 1a to 1c are arranged so that each optical axis (optical axis P) may coincide with each other. In FIG. 1, for the convenience of explanation, the set of imaging lenses 1 includes three lenses, but this structure is not limited. The lenses 1a to 1c may be any combination of convex, concave, aspherical, and spherical lenses.

The correction lens 2 is positioned at the subject side against the CCD 3, and is movable in a plane vertical to the optical axis P. The movable vertical plane of the correction lens 2 is called "correction lens movable plane." In the event of shake of digital camera 20, by moving the correction lens 2 in an opposite direction to the direction of the shake, the shake is canceled, and an image free from blurring can be focused on the CCD 3.

The CCD 3 is a semiconductor element for converting an optical signal collected by the set of imaging lenses 1 and correction lens 2 into an electrical signal to generate image data. The image processor 4 is a section for processing the image data generated in the CCD 3 by YC processing, resolution conversion, compression, etc. The liquid crystal monitor 5 is a display section for displaying the image data converted in the image processor 4. The card slot 6 is a storage medium control section for controlling writing of the image data compressed by the image processor 4 into the memory card 7. The memory card 7 is a storage medium, such as flash memory, ferroelectric memory, and other nonvolatile semiconductor memory.

The gyro sensor 9 is a measuring section for measuring the shake of the digital camera 20. More specifically, the gyro sensor 9 measures the angular velocity of the digital camera 20 to measure shake of itself. The gyro sensor 9 sends the measurement result to the controller 8 via a signal having a voltage change. The gyro sensor 9 is always working while the digital camera 20 is in operation.

The shutter button 10 is an operating section for instructing the controller 8 regarding the recording of a still picture generated in the CCD 3. When the user depresses the shutter button 10 halfway, the controller 8 detects the depression of the shutter button 10, and locks the exposure amount to an optimum value at this time. When the user depresses the shutter button 10 fully after depressing halfway, the controller 8 detects the full depression, and controls the CCD 3, image processor 4 and card slot 6 so as to generate in the CCD 3, compress the still picture in the image processor 4, and record the still picture in the memory card 7.

The controller 8 is composed of a semiconductor chip with programs stored in the chip, etc. For example, the controller 8 may be composed of a microcomputer. The controller 8 is control section for controlling the CCD 3, image processor 4, card slot 6, and driver 11. The controller 8 controls the CCD 3 to switch the operation modes such as exposure operation, CCD transfer operation, and through display monitor operation at a specified timing. The controller 8 controls the image processor 4 to switch the operation modes such as compression of a still picture and output operation to the card slot 6, and output operation of a through display image to the liquid crystal monitor 5. The controller 8 controls the card slot 6 to start writing of a still picture into the memory card 7.

The controller 8 also instructs the driver 11 on a control method of motors 12 and 13, on the basis of the measuring result of the gyro sensor 9 and a control signal from the shutter button 10. More specifically, the controller 8 integrates the angular velocity of the digital camera 20 measured by the gyro sensor 9, and instructs the driver 11 to drive the motors 12 and 13 so as to cancel the blurring amount corresponding to the integral value by adjusting the correction lens 2. The controller 8 also instructs the driver 11 to keep the correction lens 2 at the optical axis center position at least until the shutter button 10 is depressed fully, and after the shutter button 10 is depressed fully, instructs the driver 11 to correct the position of the correction lens 2 based on the detection result of the gyro sensor 9.

Herein, the output from the gyro sensor 9 is deprived of the DC component, and only AC components are used as detection result. That is, the DC component of the output signal from the gyro sensor 9 is used as a reference value to judge the measuring result of the gyro sensor 9. The controller 8 has a function of updating the reference value (DC component) to judge the measuring result of the gyro sensor 9 (this function is called "reference value updating function"). The reference value, that is, DC component is determined as an average of a signal voltage from the gyro sensor 9.

The reason for updating the reference value is that the DC component, that is, the reference value fluctuates. For example, the average of a signal voltage (DC component) from the gyro sensor 9 varies depending on the ambient temperature of the digital camera 20. This is because output of the piezoelectric element contained in the gyro sensor 9 has temperature dependency. After fluctuation of the DC component of the gyro sensor 9, if the signal voltage from the gyro sensor 9 is judged on the basis of the DC component before the fluctuation and the shake of the digital camera 20 is predicted on the basis of this judgment, the error between the predicted shake and actual shake becomes large. Such large error causes the taken image to be shaken more than necessary, not producing favorable image. Accordingly, the controller 8 detects the DC component from the gyro sensor 9, and always updates the reference value for judging the signal voltage from the gyro sensor 9 with the latest value. In the above explanation, as the fluctuation factor of the DC component of the gyro sensor 9, ambient temperature of the digital camera 20 is described as an example, but individual fluctuations among mass-produced digital cameras 20 can be considered as the factor as well.

However, this reference value updating function is controlled so as not to actuate during the period of lens correction control. This is because prevention of the reference value changing during exposure operation and the correction lens 2 changing suddenly (discontinuously) due to the change in the reference value should be achieved.

The driver 11 controls the horizontal motor 12 and vertical motor 13 according to the instruction from the controller 8. At this time, while detecting the position of the correction lens 2 on the correction lens movable plane, the driver 11 controls these motors 12, 13 so that the position of the lens 2 may be brought closer to the instruction of the controller 8. The horizontal motor 12 drives the correction lens 2 in the horizontal direction according to the control of the driver 11. The vertical motor 13 drives the correction lens 2 in the vertical direction according to the control of the driver 11.

The CCD 3 is only an example of imaging element of the invention, and the CCD 3 may be replaced, for example, by a CMOS sensor. In the case of a CMOS sensor, a reading period from each pixel of the CMOS sensor corresponds to a transfer period in the CCD. The gyro sensor 9 is an example of measuring section of shake amount of the digital camera 20 in the invention. The measuring section may include an angular acceleration sensor. In this case, by integrating the detected angular acceleration, the same effect as when detected the angular velocity is obtained. The shutter button 10 is an example of recording and indicating section of the invention. The structure including a controller 8, a driver 11, a horizontal motor 12 and a vertical motor 13 is an example of lens driving section of the invention. The motors 12 and 13 may include a linear motor, a rotary motor, a piezoelectric actuator, or the like.

FIGS. 2A and 2B show the status of an image focusing on the CCD 3. FIG. 2A shows a positional relation among the correction lens 2, the CCD 3 and the image focusing region when the center of the correction lens 2 is on the optical axis P. FIG. 2B shows a positional relation when the center of correction lens 2 is off the optical axis P. The image focusing region R is an image forming region of the subject, focusing an image on the surface of the CCD 3 by the imaging lenses 1 and correction lens 2. As shown in FIG. 2A, when the center of the correction lens 2 is on the optical axis P, the image focusing region R is small in distortion of shape and is formed in a round shape. Hence, the distortion of the image formed on the CCD 3 is small.

By contrast, when the center of the correction lens 3 is off the optical axis P as shown in FIG. 2B, the image focusing region R is distorted in shape, and is formed in a deformed round shape. As a result, the image formed on the CCD 3 is largely distorted. In particular, of the image focused on the CCD 3, the distortion is larger in the image closer to the outer edge of the correction lens 2. In FIG. 2B, the distortion is larger in the image formed in corner regions C2 and C3.

Hence, in order to suppress distortion of the image formed on the CCD 3, it is preferred to control the correction lens 2 to be on the optical axis or at its vicinal position while exposing the CCD 3. In this example, as the defect when the center of the correction lens 2 is deviated from the optical axis, large distortion of an image is explained as an example, but defects may also occur as deterioration of other optical characteristics. For example, deterioration of optical characteristics may appear, such as, poor resolution, low contrast (MTF), or large chromatic aberration.

Figure 3:
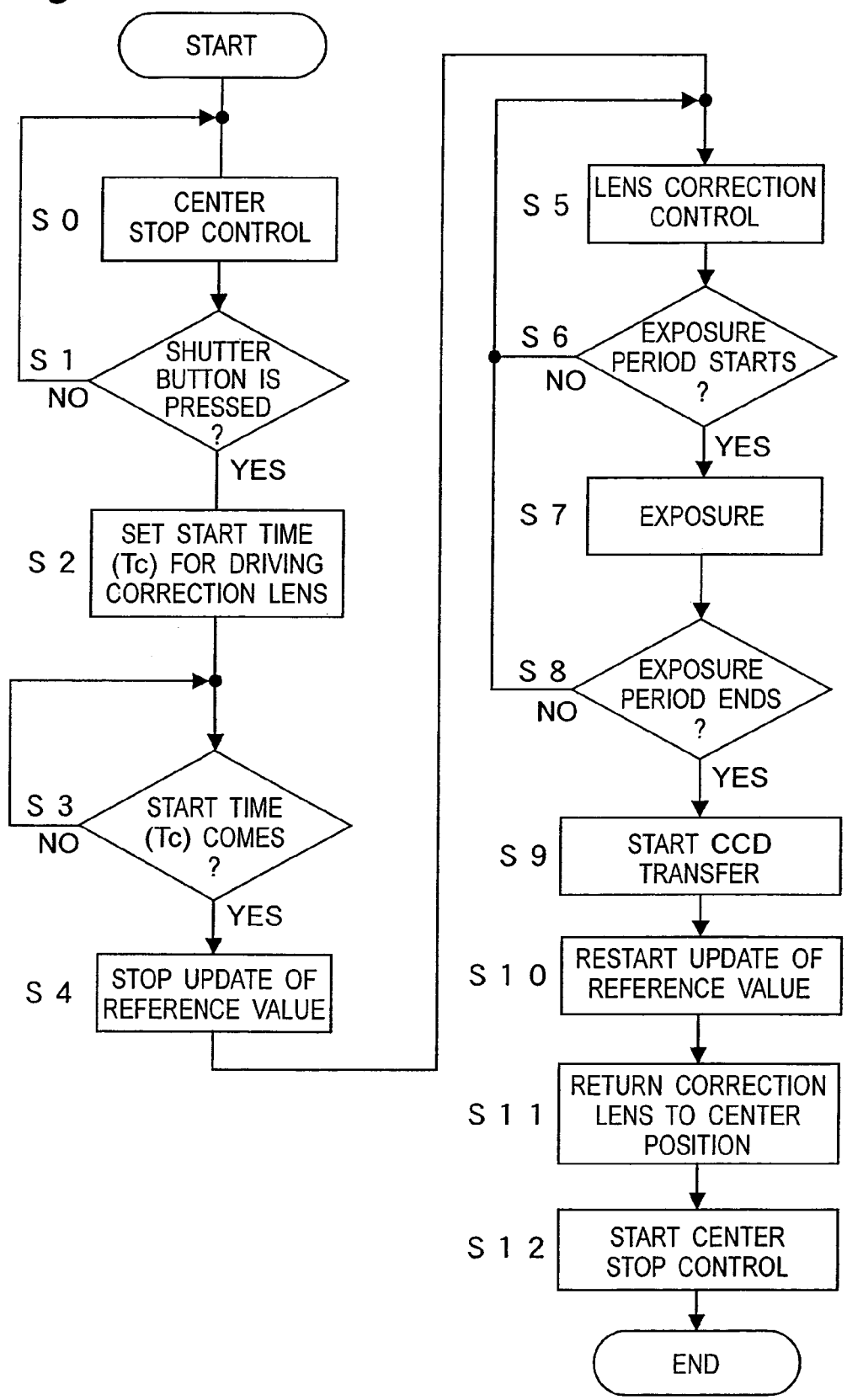
FIG. 3 is a flowchart of the operation of the imaging apparatus according to First Embodiment.

The imaging operation of the digital camera 20 having such configuration is explained below by referring to FIG. 3 and FIGS. 4A to 4G. FIG. 3 is a flowchart showing control of the digital camera 20 in an imaging operation. FIGS. 4A to 4G show timing charts during the imaging operation.

Figure 4:
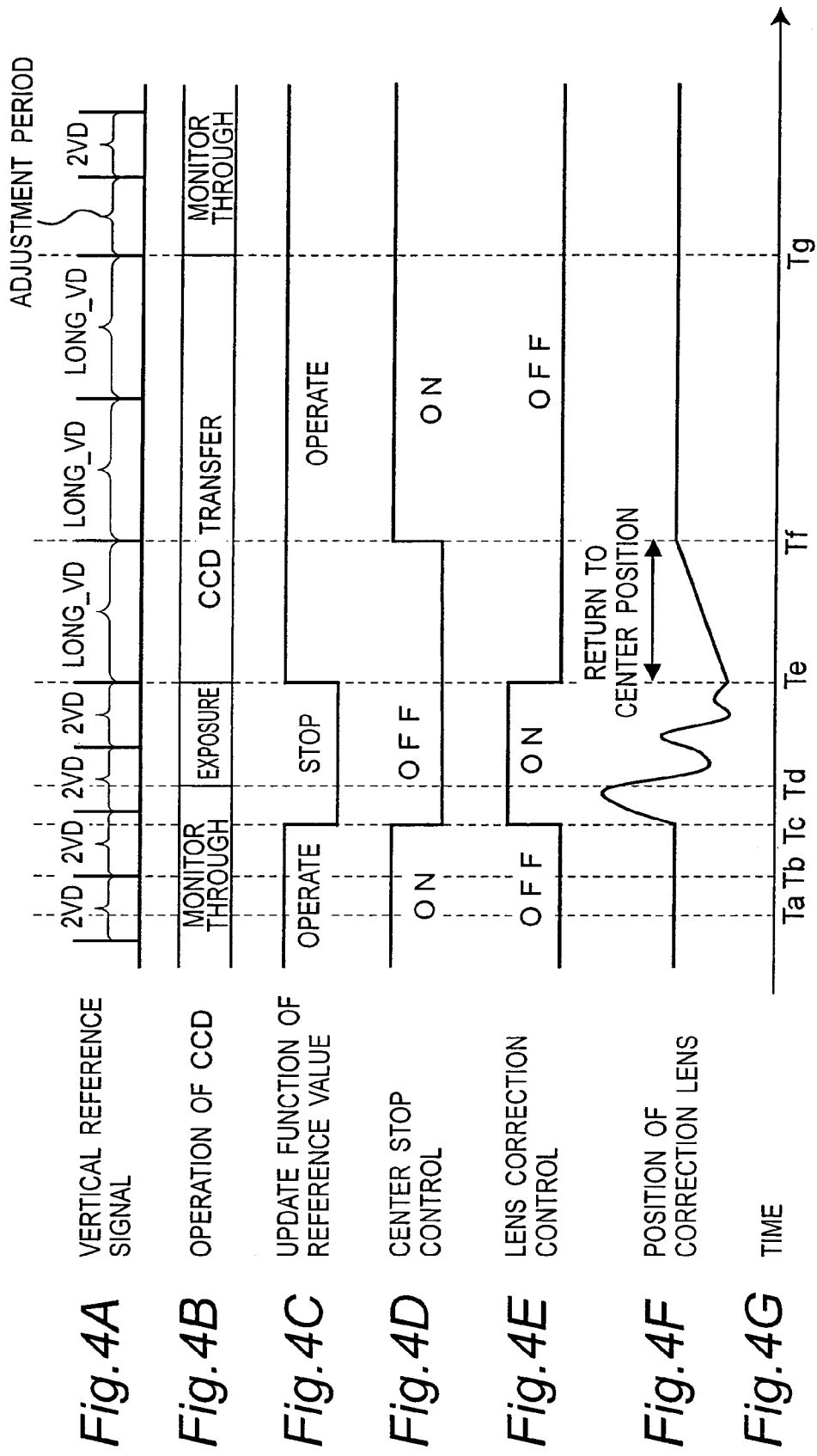
FIG. 4A is a timing chart of a vertical reference signal of the imaging apparatus according to First Embodiment.
FIG. 4B is a timing chart showing transition of operation of the CCD of the imaging apparatus according to First Embodiment.
FIG. 4C is a timing chart showing an operation/stop of update function of a reference value of the imaging apparatus according to First Embodiment.
FIG. 4D is a timing chart showing an on/off state of a center stop control of the imaging apparatus according to First Embodiment.
FIG. 4E is a timing chart showing an on/off state of a lens correction control of the imaging apparatus according to First Embodiment.
FIG. 4F is a timing chart showing change in a correction lens position of the imaging apparatus according to First Embodiment.
FIG. 4G is a timing chart showing a time elapsed for FIGS. 4A to 4F.

FIG. 4A shows a vertical reference signal of CCD 3. The CCD 3 synchronizes with this vertical reference signal, and executes operations of exposure, CCD transfer, monitor through display, etc. The vertical reference signal is transmitted in three types of periods. A first period is a period of 2.0/60 seconds ("2 VD period"). In the exposure mode and monitor-through mode, the CCD 3 operates in the 2 VD periods. A second period is a period of 4.283/60 seconds ("LONG_VD period"). The CCD 3 is designed to complete one CCD transfer mode in three LONG_VD periods. In one CCD transfer mode, image information of one frame is transferred. A third period is a period of 2.152/60 seconds ("adjustment period"). This adjustment period is prepared for one period after completion of the CCD transfer mode. In this way, the CCD transfer mode is designed to complete in three LONG_VD periods, but the CCD transfer mode may take a longer duration due to various factors. In such a case, the adjustment period is used for adjusting the extra time. The sum, which is 15/60 seconds, is obtained by adding the portion of three LONG_VD periods and one adjustment period. That is, the CCD transfer mode is designed to complete in 15/60 seconds at longest.

FIG. 4B shows a transition of operation mode of the CCD 3. The CCD 3 converts the optical signals from the subject into electric charges and accumulates, in each element, in the exposure period. In the CCD transfer period, the accumulated electric charge is output to the image processor 4 for generating a still picture. In the monitor-through period, in order to display the electric charge accumulated in each element on the liquid crystal monitor 5 as a through display image, the electric charge accumulated in each element is output to the image processor 4. Herein, the number of elements for outputting the electric charge in the CCD transfer period is far larger than that in the monitor through period. That is, the number of pixels of the image (still picture) generated in the CCD transfer period is larger than that of image (through picture) generated in the monitor-through period. Hence, the time required to transfer one still picture by CCD is longer than that in the case of monitor-through period.

FIG. 4C shows time-course changes of a reference value updating function about its operation/stop. FIG. 4D shows an on/off state of a center stop control of the correction lens 2. FIG. 4E shows an on/off state of a lens correction control. FIG. 4F shows a position variation of correction lens 2. For the convenience of explanation, the position in horizontal direction is shown, but the operation is the same in the vertical direction. Each event mentioned above proceeds from left to right in the drawing as shown in FIG. 4G.

Referring to FIG. 3, the user turns on the power of the digital camera 20. The controller 8 starts a center stop control (S0), and corrects the position of the correction lens 2 so that the center of the correction lens 20 may coincide with the optical axis P. In the center stop control, the position of the correction lens 2 is detected using the sensor attached to the correction lens 2, and the correction lens 2 is controlled to be stopped at the optical axis center position based on the detected position.

When the user adjusts the angle of view to the subject and pushes the shutter button 10 halfway, the controller 8 sets the imaging condition such as focal point and exposure amount based on the optical signal from the subject. In this state, the controller 8 monitors whether the shutter button 10 has been fully pushed or not (S1). When the shutter button 10 is fully pressed (Yes at step S1, time Ta shown in FIGS. 4A to 4G), exposure end time (Te) is calculated, and on the basis of this, start time (Tc) of driving of the correction lens 2 is set (S2).

More specifically, the controller 8 calculates the exposure time so that the exposure amount may be appropriate based on the presently set shutter speed or aperture value. The controller 8 sets the terminal end of exposure time so as to coincide with the 2 VD period of vertical reference signal of the CCD 3, in consideration of the exposure time and the time necessary for stably controlling the correction lens 2. That is, in the example shown in FIGS. 4A to 4G, the terminal end of the exposure time is set to be time Te. Thus, the controller 8 sets the start time (time Td in FIGS. 4A to 4G) of the exposure time by calculating, in reverse, from the terminal end of the exposure time. Further, the controller 8 sets the driving start time Tc of the correction lens 2 by calculating, in reverse, from the start time (Td) of the exposure time by the portion of the time necessary for controlling stably the correction lens 2.

The time necessary for stably controlling the correction lens 2 is the time required from the start of lens correction control on the correction lens 2 until following up correctly the measuring result of the gyro sensor 9 by using the controller 8, driver 11, and motors 12, 13. Such time is required because it takes a certain time from the start of the correction of the operation of the mechanism such as motors 12, 13 required to control the correction lens 2 until the operation is stabilized. This time is typically about 20 milliseconds, but it may be calculated properly by the controller 8. Depending on the characteristic of the driving mechanism of the correction lens 2 or characteristic of the gyro sensor 9, the duration of the time depends on the individual digital camera 20 or the circumstance. Hence, the controller 8 calculates the time on the basis of these various factors.

After setting the driving start time Tc of the correction lens 2, the controller 8 monitors whether it reaches the start time Tc (S3). During the monitor period, that is, before start of lens correction control, a center stop control is executed on the correction lens 2. During the monitor period, the CCD 3 accesses the controller 8 at time Tb in FIGS. 4A to 4G, and recognizes the instruction to start exposure at time Td.

When the driving start time Tc of the correction lens 2 is reached (Yes at step S3), the controller 8 inactivates (sets off) the reference value updating function as shown in FIG. 4C (S4). At the same time, the controller 8 starts lens correction control of the correction lens 2 (S5). That is, the controller 8 starts instructing the driver 11 on the basis of the measuring result of the gyro sensor 9. The driver 11 receives the instruction and starts to control horizontal motor 12 and vertical motor 13. The motors 12, 13 drive the correction lens 2 based on the control of the driver 11. The control of the correction lens 2 continues from before the start until the end of exposure in the CCD 3.

When the exposure start time Td is reached during correction control of the correction lens 2 (Yes at step S6), the CCD 3 starts exposure for recording the still picture (S7).

Upon termination of exposure time (Yes at step S8, time Te in FIGS. 4A to 4G), the CCD 3 sends the electric charge accumulated in each element, that is, the still picture to the image processor 4 (S9). This output operation is carried out in three LONG_VD periods of vertical reference signal as shown in FIG. 4B. In this period, the image processor 4 processes are received from the CCD 3 by YC processing, resolution conversion, or compression, and transmits the still picture to the card slot 6. The card slot 6 writes the received still picture into the memory card 7.

Simultaneously with CCD transfer, the controller 8 again activates the reference value updating function (ON) as shown in FIG. 4C (S10). As a result, the shake amount of the digital camera 20 can be measured appropriately on the basis of the measuring result of the gyro sensor 9 to be executed later.

Moreover, the controller 8 controls the correction lens 2 to return the optical axis center position, during CCD transfer operation (S11). Specifically, the controller 8 acquires the position of the correction lens 2 presently recognized by the driver 11, and calculates moving speed and moving direction of the correction lens 2 for returning from the present position to the optical axis center position in one LONG_VD period. The moving speed is set to move the correction lens 2 in a linear function. The controller 8 transmits the moving speed and moving direction to the driver 11. According to this instruction, the driver 11 controls the horizontal motor 12 and vertical motor 13 to make the horizontal motor 12 and vertical motor 13 drive the correction lens 2 to the optical axis center position.

When the correction lens 2 returns to the optical axis center position (time Tf in FIGS. 4A to 4G), the controller 8 starts the center stop control on the correction lens 2 (S12). This state is held thereafter. When the CCD 3 finishes the CCD transfer operation and returns to the monitor through operation (time Tg in FIGS. 4A to 4G), it returns to the state of waiting for an imaging instruction by the shutter button 10.

Thus, according to the digital camera of the embodiment, the lens control section including the controller 8, driver 11, horizontal motor 12, and vertical motor 13 executes the center stop control at least until instructed from the shutter button 10, and executes the lens correction control after instructed from the shutter button 10. By this control, upon the start of exposure of the CCD 3, the correction lens 2 can be positioned near the optical axis center position, and hence the correction lens 2 may have a large stroke. Therefore, the hand-shake correction range of the correction lens 2 can be utilized effectively, and a favorable still image with less blurring and small deterioration of optical characteristic can be obtained.

The lens control section starts the lens correction control earlier (time Tc in FIGS. 4A to 4G), by the time necessary for stably controlling the correction lens 2, than the scheduled time (time Td in FIGS. 4A to 4G) for starting exposure in the CCD 3. As a result, the lens control section can control the correction lens 2 stably in the whole period for exposing the CCD 3 (time Td to time Te in FIGS. 4A to 4G), so that a favorable shot image with less blurring and small deterioration of optical characteristic can be obtained.

Moreover, the lens control section returns the correction lens 2 to the optical axis center position before the shutter button 10 is pressed next time, after completion of exposure to the CCD 3 (time Te in FIGS. 4A to 4G). As a result, upon start of next imaging, the correction lens 2 is immediately controlled with the optical axis center position as a start point. In the prior art mentioned above, since moving the correction lens to the optical axis center position is started after pressing the shutter button, it is required to consider the moving time of the correction lens from pressing of the shutter button until start of correction operation (period of Ta to Tc shown in FIG. 4G), taking a long time until starting the correction operation after pressing of shutter button. By contrast, in the invention, the correction lens 2 is placed at the optical axis center position when the shutter button 10 is pressed. Thus it is not required to consider the time for moving the correction lens 10 to the optical axis center position, and it is required to consider only the time required for calculating the exposure time or the like. Hence, the time from pressing the shutter button 10 until the start of lens correction control (time Ta to Tc in FIGS. 4A to 4G) can be shortened, and the total imaging time can be shortened.

Second Embodiment

The digital camera 20 in First Embodiment is designed to execute the center stop control for controlling the correction lens 2 to be placed at the optical axis center position while a still picture is not generated. By contrast, in this embodiment, while a still picture is not generated, the correction lens 2 is controlled to be positioned near the optical axis center position on the basis of measuring result of the gyro sensor 9, thereby correcting blurring of an image formed on the CCD 3. As a result, as compared with the case of using the digital camera in the First Embodiment, blurring of through display image displayed on the liquid crystal monitor 5 is smaller, and the user can easily determine the angle of view of the taken image.

The hardware configuration of the digital camera in this embodiment is the same as shown in the First Embodiment, but the control method in the controller 8 is different from the First Embodiment. The controller 8, even while a still picture is not generated, controls the correction lens 2 so as to correct blurring of an image formed on the CCD 3 based on the measuring result of the gyro sensor 9. In particular, its correction range, that is, the moving range of the correction lens 2 is limited to the vicinity (within specified range) of the optical axis center position. Such a control of the correction lens 2 by the controller 8, while a still picture is not generated, is called the "central neighborhood correction control." In the central neighborhood correction control, the maximum values (upper limit, lower limit) of the moving extent of the correction lens 2 based on the measuring result of the gyro sensor 9 are set smaller than that in the case of the lens correction control.

The control of the controller 8 of the digital camera of the embodiment is explained by referring to the timing chart in FIGS. 5A to 5G.

Figure 5:
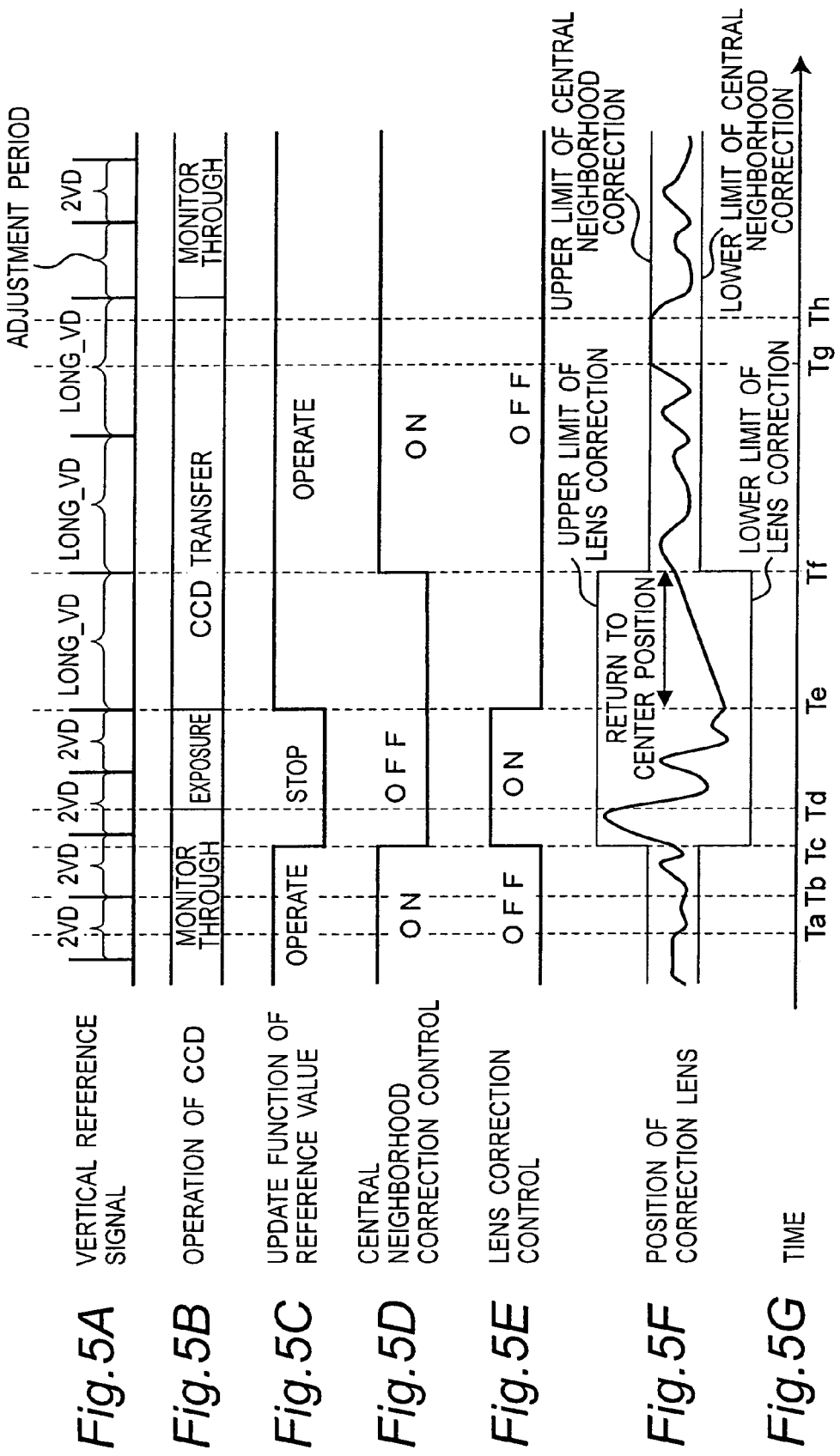
FIG. 5A is a timing chart of a vertical reference signal of the imaging apparatus according to Second Embodiment.
FIG. 5B is a timing chart showing a transition of an operation of the CM of the imaging apparatus according to Second Embodiment.
FIG. 5C is a timing chart showing an operation/stop of updating function of a reference value of the imaging apparatus according to Second Embodiment.
FIG. 5D is a timing chart showing an on/off state of a central neighborhood correction control of the imaging apparatus according to Second Embodiment.
FIG. 5E is a timing chart showing an on/off state of a lens correction control of the imaging apparatus according to Second Embodiment.
FIG. 5F is a timing chart showing a change in correction lens position of the imaging apparatus according to Second Embodiment.
FIG. 5G is a timing chart showing a time elapsed for FIGS. 5A to 5F.

FIG. 5A shows a vertical reference signal of CCD 3. FIG. 5B shows a transition of an operation mode of CCD 3. FIG. 5C shows time changes in an operation/stop of the reference value updating function. FIG. 5D shows an on/off state of central neighborhood correction control of correction lens 2. FIG. 5E shows an on/off state of the lens correction control. FIG. 5F shows the position of correction lens 2. These events progress from left to right in the direction as shown in FIG. 5G.

The user turns on the power source of the digital camera 32. When the user adjusts the angle of view to the subject and pushes the shutter button 10 halfway, the controller 8 sets the imaging conditions such as a focal point and exposure amount according to the optical signal from the subject. In this state, the controller 8 monitors whether the shutter button 10 has been pressed fully. When the shutter button 10 is pressed fully (time Ta), the exposure end time (Te) is calculated, and the start time (Tc) for driving the correction lens 2 is set according to the calculated exposure end time.

The controller 8, after setting the start time (Tc) of the lens correction control of the correction lens 2, monitors whether it reaches the start time. During the monitor period, the controller 8 executes the central neighborhood correction control on the correction lens 2. In this monitor period, the CCD 3 accesses the controller 8 at time Tb. The CCD 3 recognizes that it is instructed to start exposure at time Td.

When reaching the start time of lens correction control of the correction lens 2, the controller 8 inactivates (sets off) the reference value updating function, as shown in FIG. 5C. The control of the correction lens 2 continues from before the start of the exposure until the end of exposure in the CCD 3 (Tc to Te).

When the exposure start time Td is reached during the lens correction control operation, the CCD 3 starts exposure for recording a still picture. When the exposure time is over (time Te), the CCD 3 outputs the electric charge accumulated in each element, to send the still picture to the image processor 4. This output is executed in three LONG_VD periods of the vertical reference signal as shown in FIG. 5B. Simultaneously with CCD transfer, the controller 8 actuates (turns on) the reference value updating function again as shown in FIG. 5C. As a result, a measurement, to be executed later of the shake amount of the digital camera, can be made appropriate based on the measuring result of the gyro sensor 9.

The controller 8 also controls to return the correction lens 2 to the optical axis center position. When the correction lens 2 returns to the optical axis center position (Tf), the controller 8 executes the central neighborhood correction control on the correction lens 2. This control is kept hereinafter.

During the central neighborhood correction control, the controller 8 limits the moving range of the correction lens 2 to the vicinity of the optical axis center position, that is, within a specified range around the optical axis center position, as shown in FIG. 5F. This range is narrower than the correction range during the lens correction control. The controller 8, in the central neighborhood correction control, limits the correction range at the upper limit or lower limit of the central neighborhood correction if the correction amount of the correction lens 2 is going to exceed the upper limit or lower limit (for example, see the period of Tg to Th in FIG. 5F).

The controller 8, in the central neighborhood correction control, sets the moving amount of the correction lens 2, regarding the measuring result of the gyro sensor 9, to be smaller than that in the lens correction control (the period of Tc to Te). Accordingly, the shake correction of a through display image is slightly ineffective, and blurring of the through display image occurs, but the controller 8 can always control the correction lens 2 in the vicinity of the optical axis center position.

Thus, according to the embodiment, the lens control section including controller 8, driver 11, horizontal motor 12 and vertical motor 13 is designed to execute the central neighborhood correction control at least until receiving the instruction from the shutter button 10, and then carry out the lens correction control after receiving instruction from the shutter button 10. Thus, the correction lens 2 can be positioned near the optical axis center position upon start of exposure of the CCD 3. Further, since the through display image blurring becomes small, the user can easily determine the angle of view of the imaging picture. Therefore, the hand-shake correction range of the correction lens 2 can be utilized effectively, and a favorable still picture with small blurring and less deterioration of an optical characteristic can be obtained, and an easy-to-use digital camera can be realized.

In this embodiment, also in the central neighborhood correction control, the correction lens 2 is controlled by using the signal from the gyro sensor 9. Hence, in the process of transfer from central neighborhood correction control to the lens correction control, the lens correction control is started while the correction lens 2 is moving continuously. That is, in transfer from central neighborhood correction control to the lens correction control, the period (period from Tc to Td in FIG. 5E) provided for stabilization of the correction control on the basis of the signal from the gyro sensor 9 can be set much shorter than that in the case of First Embodiment. As a result, the start time of exposure operation is earlier, and the imaging time is shortened.

Also in this embodiment, until the shutter button 10 is pressed after end of exposure in the CCD 3 (time Te in FIGS. 5A to 5G), the correction lens 2 is returned to the optical axis center position to be controlled near the optical axis center position. Therefore, when starting imaging operation is started next time, the correction lens 2 can start the lens correction control from the vicinity of optical axis center position, and the time required until the start of the exposure operation can be shortened, and the imaging time is further shortened.

The first and second embodiments refer to single shot operation of a still picture, but the invention can be also applied in continuous shooting mode. That is, in the case of continuous shooting mode, too, after an end of the first exposure, the correction lens 2 is returned to the optical axis central position during CCD transfer operation, and after an end of the CCD transfer, the second shooting is started.

Also in the first and second embodiments, when the correction lens 2 is returned to the optical axis center position, the correction lens 2 is moved in linear function, but this is not limited. For example, the correction lens 2 may be moved progressively toward the optical axis P in an inverse proportional function. Thus, approaching the center of optical axis earlier, the correction lens 2 can be stopped slowly without impact.

In the first and second embodiments, the lens correction control is started just before an exposure start of CCD 3 (time Tc), but lens correction control can be started simultaneously with the exposure start of CCD 3 (time Td). As a result, upon the exposure start of CCD (time Td), the correction lens 2 can be securely positioned at or near the optical axis center position, and the correction lens 2 has the largest stroke. Therefore, the hand-shake correction range of the correction lens 2 can be utilized effectively, and a favorable still picture free from hand-shake can be obtained.

In the first and second embodiments, the lens control section does not actuate the reference value updating function during the period of lens correction control (Tc to Te), but the reference value updating function may be inactivated only during exposure time of CCD (Td to Te).

In the first and second embodiments, the shutter button 10 is shown as an example of recording section, but not limited to this. For example, an imaging start signal may be given by a remote control for transmitting to the digital camera 20.

In the first and second embodiments, a vertical reference signal for a CCD of 4 M pixels is shown. But this is not limited. For example, in the case of CCD 3 of 3 M pixels, the LONG_VD period may be set to 1/60 seconds, and the CCD transfer period may be set to two LONG_VD periods.

Third Embodiment

The digital camera of this embodiment is intended to prevent a defect of occurrence of new blurring of an image ("image blurring due to over-correction") due to excessive movement of the correction lens 2 by more than what is necessary when lens correction control is started (time Tc in FIGS. 11A to 11H). According to this embodiment, image blurring due to over-correction can be solved in a short time, and the imaging time can be shortened.

The hardware configuration of the digital camera of this embodiment is basically the same as the configuration in FIG. 1, but only the structure of the controller 8 is different. In this embodiment, the controller 8 calculates the virtual lens position of the correction lens 2 on the basis of the measuring result of the gyro sensor 9.

The virtual lens position is a virtual position of the correction lens 2 calculated by the controller 8 based on the measuring result by the gyro sensor 9, and it is always calculated whether the correction lens 2 is actually moved or not. More specifically, it is obtained by integrating the angular velocity which is a measuring result of the gyro sensor 9.

Figure 6:
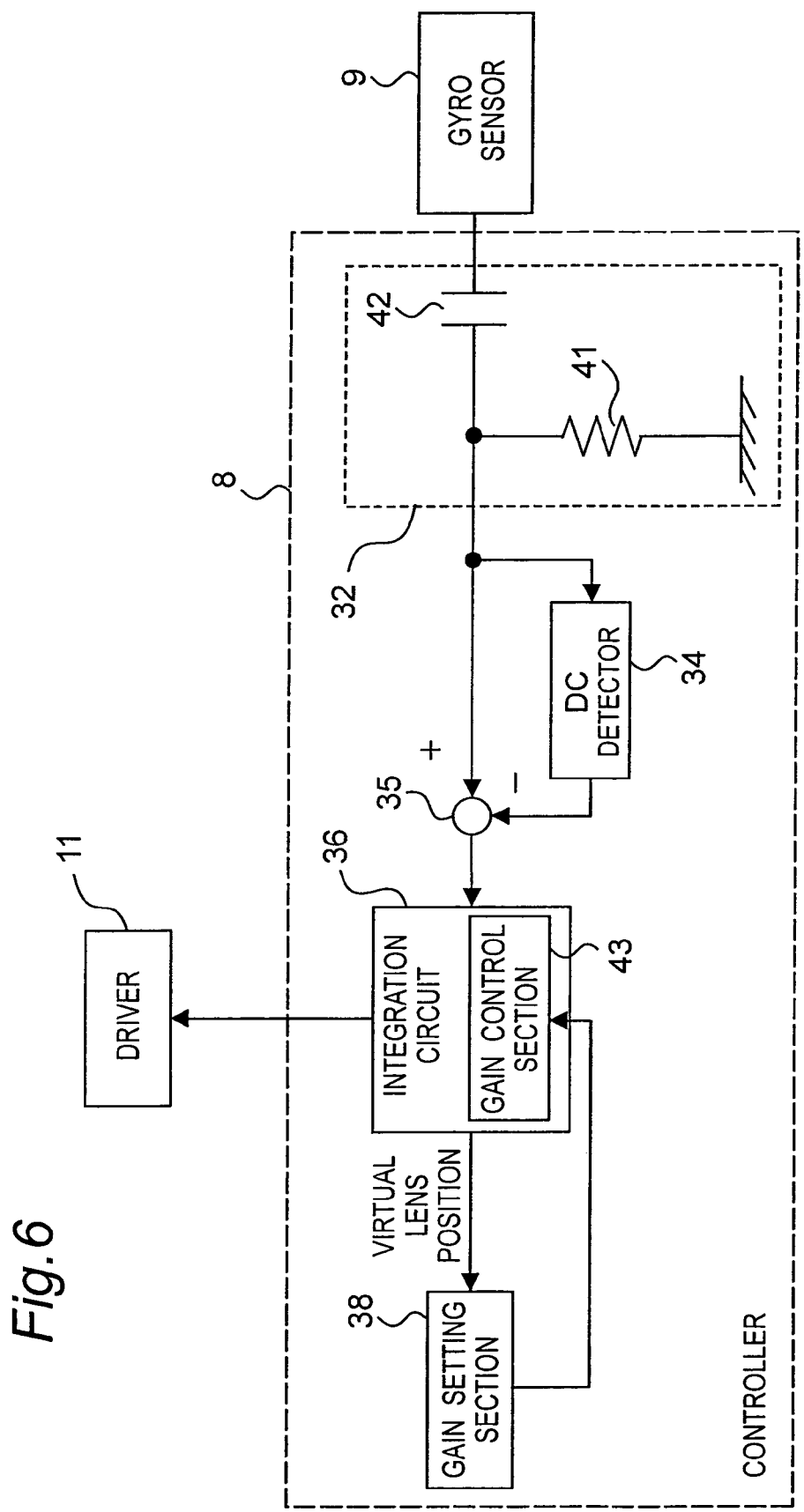
FIG. 6 is a diagram for a configuration required for calculating the virtual lens position of a controller according to Third Embodiment of the invention.

FIG. 6 shows a configuration necessary for calculation of a virtual lens position in the controller 8. The controller 8 includes high pass filter 32, a DC detector 34, a subtractor 35, an integrating circuit 36, and a gain setting section 38. The high pass filter 32 is composed of resistance 41 and capacitor 42, and is designed to pass a signal of about 0.05 Hz or more. The integrating circuit 36 includes a gain control section 43. The gain setting section 38 may be included in the integrating circuit 36.

The gyro sensor 9 outputs angular velocity information. The AC component of the angular velocity information is extracted by the high pass filter 32, and this AC component is integrated by the integrating circuit 36 to obtain the virtual lens position as the control target of the correction lens 2.

The DC detector 34 detects the DC component of the output of the high pass filter 32. The DC component of the output of the high pass filter 32 is the same as the reference value in the reference value updating function mentioned in the first and second embodiments. In other words, the reference value updating function is realized by the DC detector 34. However, the DC detector 34 is designed to detect the DC component as reference value and update the value only when the camera is detected to be remaining stationary.

The subtractor 35 subtracts the detected DC component from the output of the high pass filter 32. By this configuration, the DC component included in the output of the high pass filter 32 can be removed.

Figure 7A:
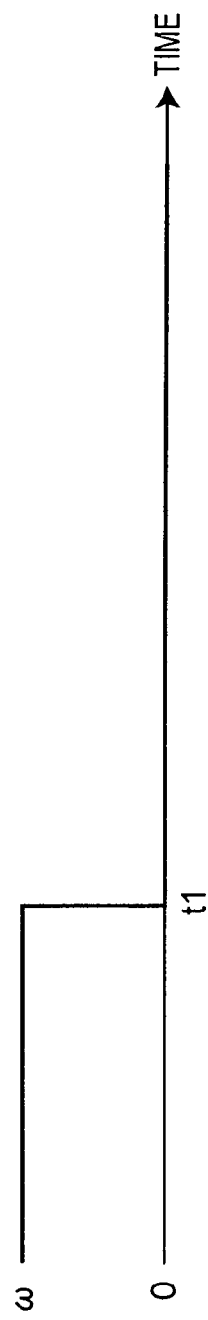
FIG. 7A is a diagram showing an example of an output signal of a gyro sensor.

The reason why the DC component must be detected and removed is explained below by referring to FIGS. 7A to 7D. Suppose the gyro sensor 9 outputs a signal as shown in FIG. 7A. This output has a certain angular velocity $\omega$ until time t1, and becomes 0 after time t1. Such output is obtained, for example, when the camera is made stationary after panning until time t1.

Figure 7B:
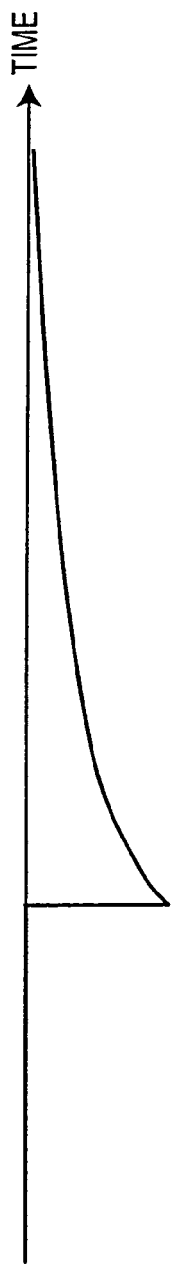
FIG. 7B is a diagram showing a waveform of an output of a high pass filter with the output signal of the gyro sensor shown in FIG. 7A.

When such output is put into the high pass filter 32, the output of the high pass filter 32 shows a signal track as shown in FIG. 7B. That is, it changes suddenly at time t1, and is gradually approaching 0, and becomes 0 shortly (in about 20 to 30 seconds). This is a characteristic derived from the time constants of capacitor 42 and resistance 41 of the high pass filter 32. By this characteristic, the DC component not contained originally in the output of the gyro sensor 9 is included in the output of the high pass filter 32. When this DC component is integrated in the integrating circuit 36 described below, the actual blurring is corrected more than necessary, and an excessive image blurring occurs.

The mechanism of occurrence of image blurring due to over-correction is specifically described below.

As mentioned above, the DC component included in the output of the gyro sensor 9 is removed by the high pass filter 32. The DC component due to the time constant of the capacitor 42 and resistance 41 of the high pass filer 32 is removed by the DC detector 34 and subtractor 35.

Figure 7C:
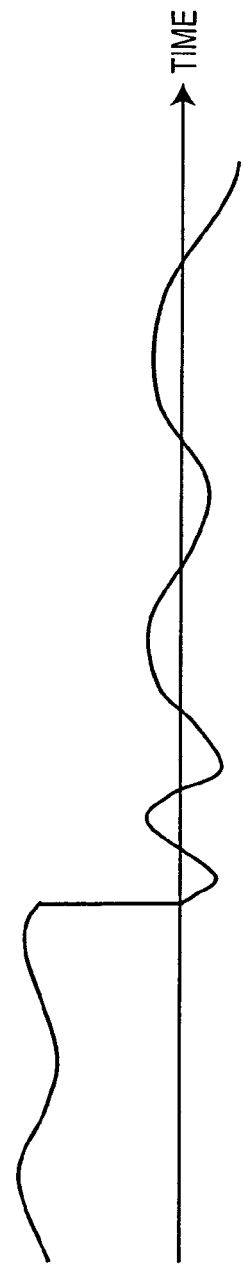
FIG. 7C is a diagram showing an example of a waveform of the output signal of the gyro sensor, including AC components.

However, the DC detector 34 is designed to detect and update the DC component (reference value) only while the camera remains stationary. Therefore, when the stopped state is held, as shown in FIG. 7A, the DC detector 34 can detect the DC component correctly, and remove the DC component from the high pass filter output. But, while the stationary state is not maintained as shown in FIG. 7C, it cannot remove the DC component. In the case of actual imaging by camera, the output of the gyro sensor 9 often appears as shown in FIG. 7C. The reason is understood considering that it is really difficult to stop the camera completely right after panning operation.

Figure 7D:
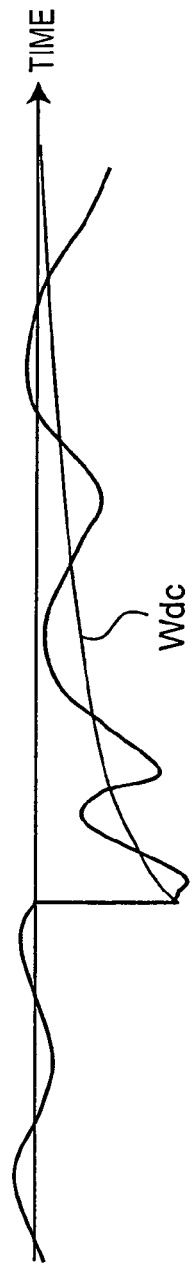
FIG. 7D is a diagram showing a waveform of the output of the high pass filter for the output signal of the gyro sensor shown in FIG. 7C.

Therefore, when stationary state is not maintained as in FIG. 7C, the correct DC detection output is not output from the DC detector 34, and an extra DC component (Wdc) may remain in the input signal to the integrating circuit 36 (see FIG. 7D). The integrating circuit 36 integrates also such extra DC component (Wdc). As a result, the output value of the integrating circuit 36 increases gradually in one direction on the correction lens movable plane. The absolute value of the virtual lens position increases gradually. On the basis of the result of this integration, the correction lens 2 is driven according to the blurring information different from the actual blurring, and the correction lens 2 is moved more than necessary, which may lead to image blurring due to over-correction.

To prevent such image blurring due to over-correction, the DC component Wdc included in the output of the high pass filter 32 is removed by the DC detector 34 and subtractor 35.

The integral gain of the integrating circuit 36 is explained. The integrating circuit 36 integrates the AC component of angular velocity information output from the high pass filter 32. At this time, the gain of integral value is adjusted by the gain control section 43. The integral gain adjusted by the gain control section 43 has a frequency characteristic as shown in FIG. 8. That is, the integral gain increases along with a frequency in a lower frequency region than a specified frequency (1 Hz in this embodiment), with respect to the output frequency of the subtractor 35, and is set to be almost constant in higher frequency region than the specified frequency. The integral gain in the low frequency region is set to be smaller than that in the high frequency region. The degree of correction is small when the digital camera is oscillating slowly, and that the degree of correction is large when oscillating faster. This frequency characteristic is, however, only an example.

The integral gain is also changed depending on the virtual lens position in the low frequency region. In FIG. 8, graphs Ga, Gb, and Gc show the integral gains corresponding to different virtual lens positions (A, B, C shown in FIG. 9), respectively. This change is executed in the gain setting section 38. The gain setting section 38 determines the initial value of integral gain in the low frequency region depending on the value of the virtual lens position as output from the integrating circuit 36. That is, as shown in FIG. 9, when the absolute value of the virtual lens position is small (the virtual lens position is at the vicinity of the optical axis), the initial value of integral gain in the low frequency region is set constant. At this time, the region of the virtual lens position is called a "constant region." On the other hand, when the absolute value of the virtual lens position is out of the constant region, the larger the absolute value (as the virtual lens position is apart from the optical axis), the smaller the integral gain. At this time, the region of the virtual lens position is called a "variable region." Thus, setting the integral gain is to be smaller as the virtual lens position is apart from the optical axis section that excessive correction is not applied to small oscillation (oscillation in the low frequency region) while the virtual lens position is apart from the optical axis.

Back to FIG. 8, the integral gain in the high frequency region (equal to or more than 1 Hz), different from the characteristic of integral gain in low frequency region (less than 1 Hz), does not depend on the virtual lens position. When the value of integral gain in the low frequency region is small, small blurring is not corrected, but blurring of high frequency such as hand-shake in case of shooting (usually about 1 to 20 Hz) can be securely corrected because a high integral gain is set.

Figure 10:
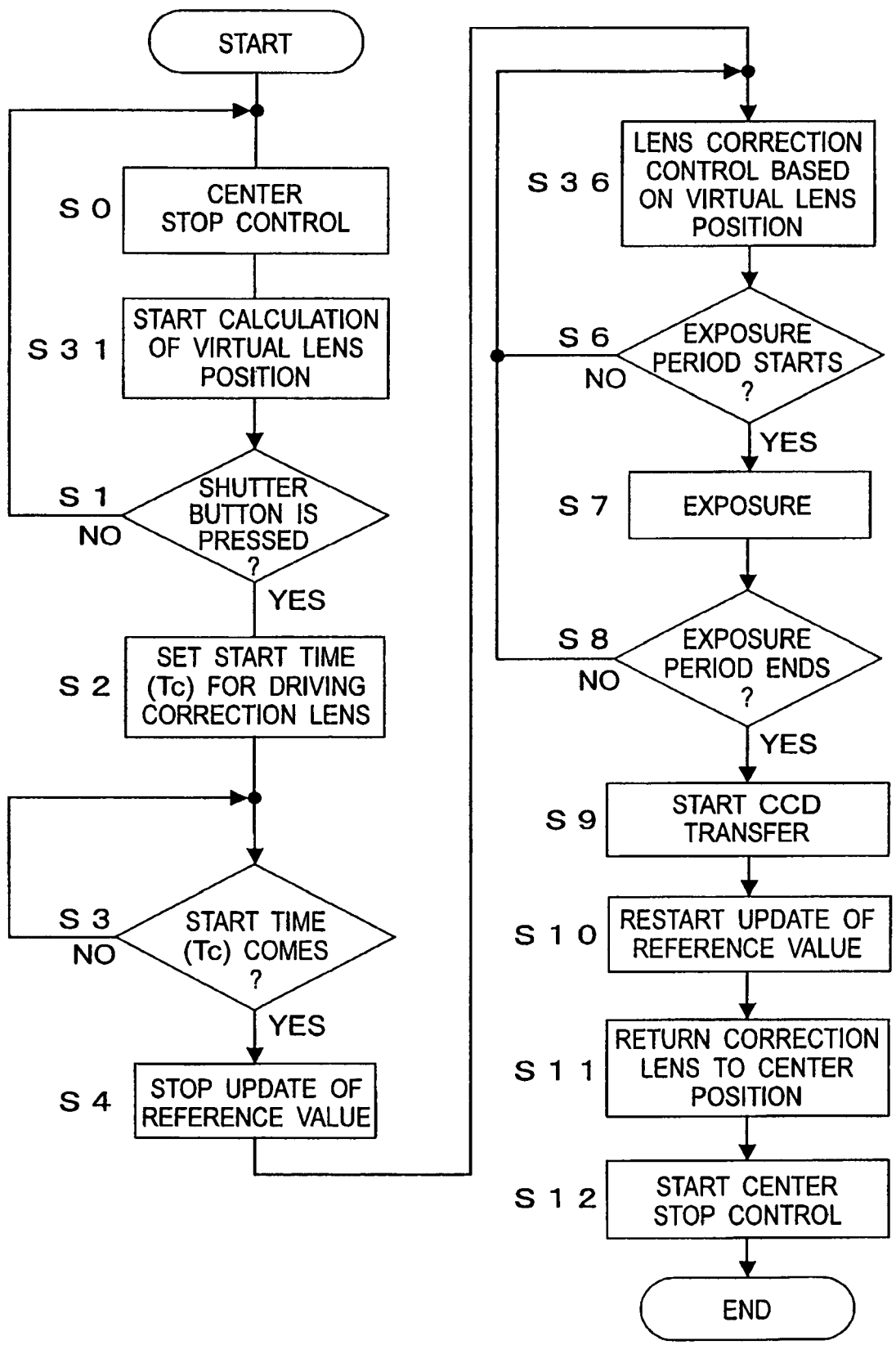
FIG. 10 is a flowchart of an operation of the imaging apparatus according to Third Embodiment.

Referring to FIG. 10 and FIGS. 11A to 11H, the operation of the controller 8 of the embodiment is explained. The process shown in FIG. 10 is that the control on the basis of virtual lens position of the present embodiment is added to the control in the First Embodiment.

As shown in FIG. 10, the controller 8 is always calculating the virtual lens position during operation of the digital camera (S31). While the lens correction is not controlled (see FIG. 11E) (time Ta to Tc, and after Te), the controller 8 executes the center stop control, but in this period, the virtual lens position is calculated only, and is not used in the actual control.

On the other hand, during the lens correction control (time Tc to Te), the controller 8 actually controls the position of the correction lens 2 on the basis of the calculated virtual lens position (S36). In this case, the control is not executed to match the virtual lens position with the actual position of the correction lens 2. The control is executed to match the actual position of the correction lens 2 with a value (value indicated by broken line Y in FIG. 11G, which is obtained by subtracting the blurring amount (Adc) from the central position of the virtual lens position when the lens correction control is started (time Tc)), from the virtual lens position. That is, in the period of the lens correction control, the control is made to match the actual position of the correction lens 2 with the shifted value of the calculated virtual lens position by the blurring amount (Adc). In this manner, a sudden move of the correction lens 2 at time Tc can be prevented.

In this configuration, the reason of improving the over-correction is explained by using two separate cases including a case capable of detecting the DC component and a case of the DC detector 34 not capable.

In the case that the DC detector 34 is capable of detecting the DC component, DC component is not included in the input signal to the integrating circuit 36, and hence the result of integration is not deviated.

By contrast, when the DC detector 34 cannot detect the DC component, the DC component is contained in the input signal to the integrating circuit 36, and the result of integration is deviated. However, when the DC detector 34 cannot detect the DC component, it is highly possible that the virtual lens position is apart from the center. When the virtual lens position is apart from the central position (optical axis position), as shown in FIG. 9, the integral gain is set small in the low frequency region, and the integral value is prevented from increasing, and hence the correction lens is suppressed from moving more than necessary, and image blurring due to over-correction can be decreased.

Hence, image blurring due to over-correction can be suppressed. The concept of this embodiment can be also applied to the lens correction control in the Second Embodiment.

Incidentally, the high pass filter 32, DC detector 34, subtractor 35 and others may be also provided outside of the controller 8.

The invention presents an imaging apparatus capable of shortening the imaging time of still picture while suppressing hand-shake, and is applicable to electronic appliances having imaging function such as a digital still camera and a cellular phone with camera. In particular, it is useful in the imaging apparatus capable of imaging at high multiplying factor optically.

The invention claimed is:

1. An imaging apparatus for generating still picture data by receiving an optical signal of a subject, the imaging apparatus comprising:
   an imaging element that generates a still picture by exposure to the optical signal of the subject;
   a plurality of imaging lenses that collect the optical signal of the subject and focus an image on the imaging element;
   a correction lens that is movable on a plane vertical to an optical axis of the imaging lenses to correct image blurring formed on the imaging element;
   a measuring section that measures shake of the imaging apparatus;
   an instruction section that instructs a start of recording a still picture generated by the imaging element;
   an image processor that processes the image by receiving the still picture transferred from the imaging element; and
   a lens controller that selectively performs a center stop control and a lens correction control, the center stop control for controlling a position of the correction lens to stop the correction lens at an optical axis center position which is a position of the correction lens at which the optical axis of the imaging lenses coincides with an optical axis of the correction lens, and the lens correction control for controlling the position of the correction lens to correct blurring of the image formed on the imaging element based on a measuring result of the measuring section,
   wherein the lens controller performs the center stop control until receiving an instruction to start recording from the instruction section, and performs the lens correction control after a start of exposure to the imaging element, and
   wherein the lens controller returns the correction lens to the optical axis center position before a completion of transfer of a still picture from the imaging element to the image processor after completion of the exposure to the imaging element, and then performs the center stop control on the correction lens.

2. The imaging apparatus of claim 1, wherein the lens controller starts the lens correction control earlier than a start time of exposure to the imaging element by a time necessary for controlling the correction lens in a stable manner.

3. The imaging apparatus of claim 1, wherein the lens controller includes a reference value updating function for updating a reference value used for judging the measuring result of the measuring section, and keeps the reference value updating function inactivate while controlling the lens correction.

4. The imaging apparatus of claim 1, further comprising an integrating section that integrates the measuring result of the measuring section,
   wherein the lens controller calculates a virtual position of the correction lens based on an output of the integrating section, and performs the lens correction control according to the virtual position, and
   wherein the integrating section adjusts a gain on the integration of the measuring result of measuring section according to the virtual position of the correction lens calculated by the lens controller.

5. The imaging apparatus of claim 4, wherein, when a region of shake frequency of the imaging apparatus is smaller than a predetermined value, the integrating section adjusts the gain so that (i) the gain is constant when the virtual position of the correction lens is within a predetermined range from the optical axis center position, and (ii) the gain decreases along with a distance from the optical axis center position when the virtual position of the correction lens is outside the predetermined range.

6. The imaging apparatus of claim 5, wherein the integrating section adjusts the gain so that (i) the gain increases along with an increase of the shake frequency when the shake frequency of the imaging apparatus is smaller than the predetermined value, and (ii) the gain is constant when the shake frequency of the imaging apparatus is more than the predetermined value.

7. A method of controlling an imaging apparatus for generating still picture data by receiving an optical signal of a subject, the imaging apparatus comprising an imaging element that generates a still picture by exposure to the optical signal of the subject, a plurality of imaging lenses that collect the optical signal of the subject and focus an image on the imaging element, an image processor that processes the image by receiving the still picture transferred from the imaging element, and a correction lens movable on a plane vertical to an optical axis of the imaging lenses to correct image blurring formed on the imaging element, the method comprising:

measuring shake of the imaging apparatus;

receiving an instruction to start recording a still picture generated by the imaging element;

performing a center stop control until an instruction to start recording the still picture is received, the center stop control controlling a position of the correction lens to stop the correction lens at an optical axis center position which is a position of the correction lens at which the optical axis of the imaging lenses coincides with an optical axis of the correction lens;

performing a lens correction control after a start of exposure to the imaging element, the lens correction control controlling the position of the correction lens to correct blurring of the image formed on the imaging element based on a measuring result of the measuring of the shake of the imaging apparatus; and returning the correction lens to the optical axis center position before a completion of transfer of a still picture from the imagining element to the image processor after completion of the exposure to the imaging element, and then performing the center stop control on the correction lens.

* * * * *